March 21, 1939.  T. A. J. HAYES  2,151,272
SIGNAL SYSTEM
Original Filed July 22, 1932  8 Sheets-Sheet 1

March 21, 1939.  T. A. J. HAYES  2,151,272
SIGNAL SYSTEM
Original Filed July 22, 1932   8 Sheets-Sheet 2

March 21, 1939.    T. A. J. HAYES    2,151,272
SIGNAL SYSTEM
Original Filed July 22, 1932    8 Sheets-Sheet 3

March 21, 1939.   T. A. J. HAYES   2,151,272
SIGNAL SYSTEM
Original Filed July 22, 1932    8 Sheets-Sheet 5

March 21, 1939.  T. A. J. HAYES  2,151,272
SIGNAL SYSTEM
Original Filed July 22, 1932   8 Sheets-Sheet 8

Fig.13.

Inventor
Timothy A. J. Hayes
by Charles W. McDermott
his Attorney

Patented Mar. 21, 1939

2,151,272

UNITED STATES PATENT OFFICE 2,151,272

SIGNAL SYSTEM

Timothy A. J. Hayes, deceased, late of Boston, Mass., by Josephine Hayes Greene, administratrix, Newton, Mass., assignor to Edmund C. Mayo, Providence, R. I.

Refiled for abandoned application Serial No. 624,028, July 22, 1932. This application November 23, 1938, Serial No. 242,108

22 Claims. (Cl. 179—5)

The present invention relates to signal systems which are used by the police in urban communities.

This application is a refile for abandoned application Ser. No. 624,028, filed July 22, 1932.

Heretofore these systems provided means whereby the patrolmen could communicate with the station house from one of the patrol boxes on the street either to call the wagon to the box pulled or to register a duty call at the station house, but no means was provided for signalling the patrolmen on the street from the station house or for a citizen on the street to call to his assistance help either from the station house or from the patrolmen on duty on the streets.

The principal object of the present invention is to produce a signal system by which the station house may check readily the activities of the patrolmen on duty on the streets, by which the station house may marshal quickly and efficiently the patrolmen in the streets, on foot, in automobiles and on motorcycles, by which the station house may distribute promptly information and orders to the patrolmen on duty in the streets, by which a citizen in the street may summon assistance both from the station house and from the patrolmen on duty in the streets, by which a patrolman on duty may summon aid in the case of need, and by which the calls both from the patrolmen and the citizens may be recorded accurately at the station house.

To the accomplishment of this object, and such others as may appear hereinafter, the various features of the present invention consist in certain constructions, combinations and arrangement of parts, or circuits hereinafter described, and then set forth broadly and in detail in the appended claims, possessing advantages readily apparent to those skilled in the art.

The various features of the present invention will be understood readily from an inspection of the accompanying drawings, illustrating the best form of the invention at present devised, in which.

The illustrated embodiment of the present invention provided a patrol box system with patrol boxes located conveniently on the streets and connected by electric circuits to the police station house through equipment which, 1. Enables any police officer on the streets to communicate at any time by recorded signal and by telephone with police stations and commanding officers.

2. Enables a police officer at any patrol box to cause visual signals to be displayed at the patrol boxes in the neighborhood and in the division police station, which signals call other police officers to his particular location and to his aid.

3. Enables any civilian by pulling a hook at a patrol box to display the visual signals on the patrol boxes in his neighborhood and to operate both a visual and an audible signal in the division police station, to call the police to his location and to his aid, and 4. Enables the officer in charge at a police station to display the visual signals at the patrol boxes in a particular neighborhood, which signals call the patrol officers to any nearby box to receive instructions by means of the telephone service included in the patrol box system.

The signal desk 14 (Figs. 1 and 2) is located at the station house, or division headquarters, and comprises an ordinary office desk upon which is mounted a cabinet 15 carrying operating devices for four patrol circuits, four citizen's alarm and flashing circuits, one test circuit, and one garage circuit. However, since all of the patrol, citizen's alarm and flashing circuits are identical, respectively, reference hereinafter will be made to one only of the duplicate circuits.

In the upper left hand compartment of the cabinet 15 is the printing register 16 and the time stamp 17. The register and stamp operate upon a paper tape two inches wide which is drawn from a reel 18, through the register and stamp, by a reel 19 which is driven automatically by an electric motor 20. After leaving the time stamp the tape passes through a tube 21 which turns the tape so as to expose its printed and stamped face to the view of the signal desk attendant.

The signal desk is provided with a telephone set comprising a receiver 22, a transmitter 23, two bells 24 and 25, a volt meter 26, a test switch 27, a bull's eye 28 for each of the four citizen's alarm and flashing circuits, a bull's eye 29 for the test circuit, a switch 30 in each of the flashing circuits for starting the generator-set, a switch 31 for starting the generator-set for the purpose of testing, two keys 32 and 33 for each of the patrol circuits, two keys 34 and 35 for the garage circuit, a pilot lamp 36 for each of the patrol circuits, a pilot lamp 37 for the garage circuit, and a clock 38.

The patrol box 39 (Figs. 3, 4, and 6) is mounted on a standard 40 and comprises an outer door 41 normally closed and locked, but adapted to be opened by the patrolman to expose an inner door 42 upon the front and rear faces of which are mounted the devices for operating the main patrol box and auxiliary circuits.

Figure 3:
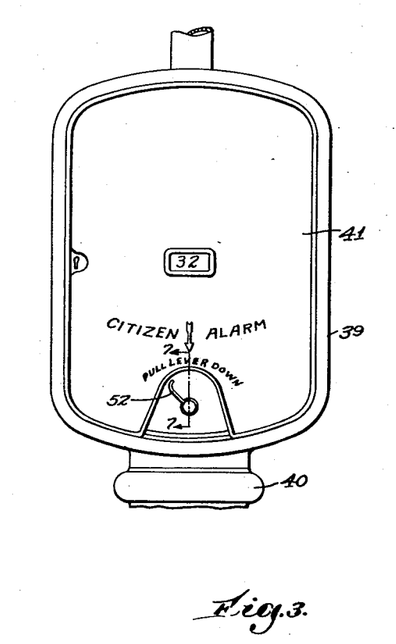
Figure 3 is a detail view in front elevation of the patrol box, the outer door of which is closed and locked.

It will be understood that each patrol circuit comprises a plurality of patrol boxes each numbered differently, the one illustrated in Fig. 3 being numbered 32.

Suspended from the end of a bent pipe 43 (Fig. 4), supported from the patrol box 39, is a lantern 44 designed to give a signal in the daytime visible at a distance of fifteen hundred feet. To this end a "Mazda" lamp with long filaments (not shown) is enclosed in a "Fresnel" lens 45 all the prisms of which are visible. The hood 46 of the lantern is designed to shed the rays of the sun without obstructing the signal which passes, from the center of the lens 45 in a beam two inches wide, in all directions. The lens has a dark ruby color which may be plainly seen in daylight and which imparts a brilliant signal at night.

Figures 4, 5:
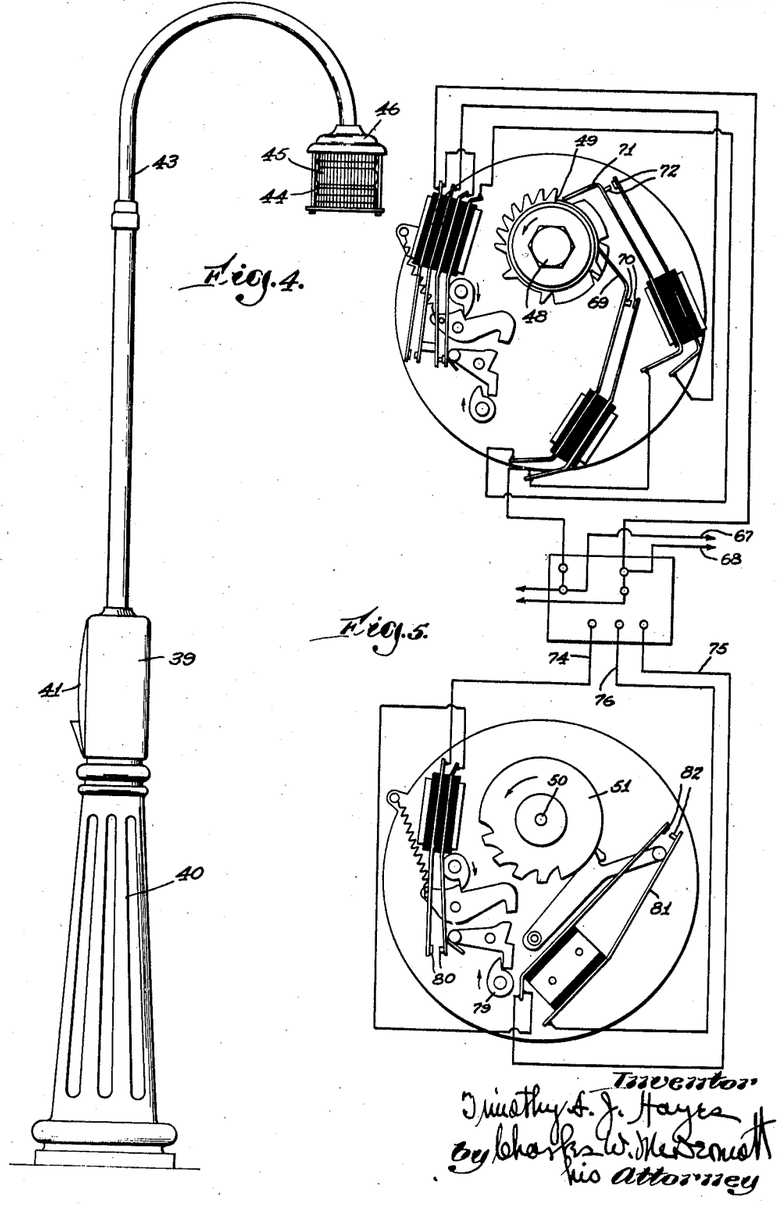
Figure 4 is a view in right side elevation of the patrol box showing the signal light lantern carried thereby.
Figure 5 is a detail view in rear elevation of the officer and citizen's alarm code wheels and the associated wiring diagrams.

The outer face of the inner door 42 of the patrol box carries a pointer 47 (Fig. 6) secured to a rockshaft 48 which carries the officer's code wheel 49 (Fig. 5). The outer face of the inner door 42 carries a rock-shaft 50 (Figs. 5, 6, and 7) upon which is mounted the citizen's alarm code wheel 51 (Fig. 5). The front end of the rock-shaft 50 carries an operating arm 52 (Figs. 3 and 7) which, as shown in Fig. 3, may be operated when the outer door is closed and locked. The inner door 42 is provided with a plunger switch 53 which is actuated by a lug 54 mounted on the inner face of the outer door 41. The inner door 42 carries also a telephone transmitter 55 (Fig. 6) and a 70 ohm telephone receiver 56.

The telephone receiver 56 permits the patrolman to receive while both his hands are free to write an order in his book. To this end the receiver is mounted on one end of an arm 57 the other end of which is provided with a cup 58 forming one-half of a casing which houses a switch. The rim of the cup 58 engages freely the rim of a cup 59 secured to the inner door 42 and forming the other half of the casing for the switch. The switch comprises a pin 60 (Fig. 8) projecting laterally from the cup 59 and a pair of contacts 61 carried from the cup 58. Normally the pin 60 separates the contacts 61. When the officer desires to receive he swings the receiver 56 outwardly away from the inner door 42 thus rotating the cup 58 on the cup 59 and removing the pin 60 from between the spring arms for the contacts 61 which engage to close the circuit. In order that the receiver 56 may be retained in the position to which it has been swung to permit the officer to use both hands in recording orders, the center of the cup 58 loosely receives a threaded rod 62 projecting laterally from the center of the cup 59. The rims of the cups 58 and 59 are held in frictional engagement by a spring washer 63 (Fig. 6) mounted on the rod 62 and interposed between the cup 58 and a thumb nut 64 threaded on the rod 62.

Figure 9:
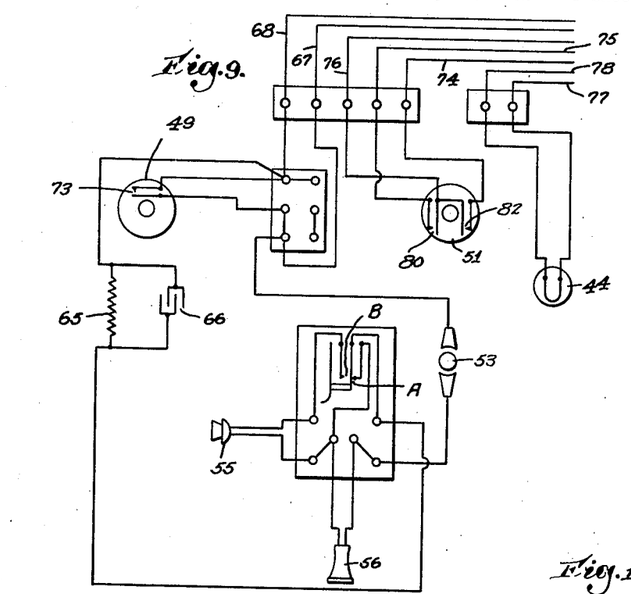
Figure 9 is a diagrammatic view of the patrol box circuits.

The patrol box is shown in Figure 9. It is designed to provide means for telephone conversation between the patrolman and his station house, or simply registering the box number at the station house for a duty call, and for a citizen's alarm whereby a citizen may call aid to a particular box and register the box number at the station house. In addition to the lantern 44, the telephone transmitter 55, the telephone receiver 56, the telephone switch, the plunger switch 53 and the code wheels 49 and 51, the elements contained in the patrol circuit are a 1250 ohm resistance 65, in Fig. 9 and a two microfarad condenser 66.

When the outer door 41 to the patrol box 39 is opened the plunger switch 53 closes and connects the resistor 65 across the lines 67 and 68 (48 volts) and causes one of the pilot lamps 36 (Fig. 1) to light at the signal desk. When the patrolman swings the receiver 56 outwardly the circuit is broken at A (Fig. 9), but is reestablished at B, thus putting the transmitter 55 in the telephone circuit. When the receiver is "on the hook" there is a complete circuit and the signal desk attendant, as will be described more in detail hereafter, may send alternating current over the circuit to "howl" in the receiver if he wishes to recall the patrolman after he has replaced the receiver back on the hook.

The officers' alarm circuit operates over lines 67 and 68 and is set in operation by moving the pointer 47 (Fig. 6) either to the position T or the position W. Movement of the pointer 47 to either position causes a spring to be wound and the code wheel 49 to rotate. When the pointer 47 is moved to the W position (Fig. 6) the spring is wound tight. When the pointer 47 is moved to the T position (Fig. 6) the spring is only partially wound. Thus, movement of the pointer to the W position imparts a greater rotative movement to the code wheel 49 than when the pointer is moved to the T position.

Figures 6, 7, 8:
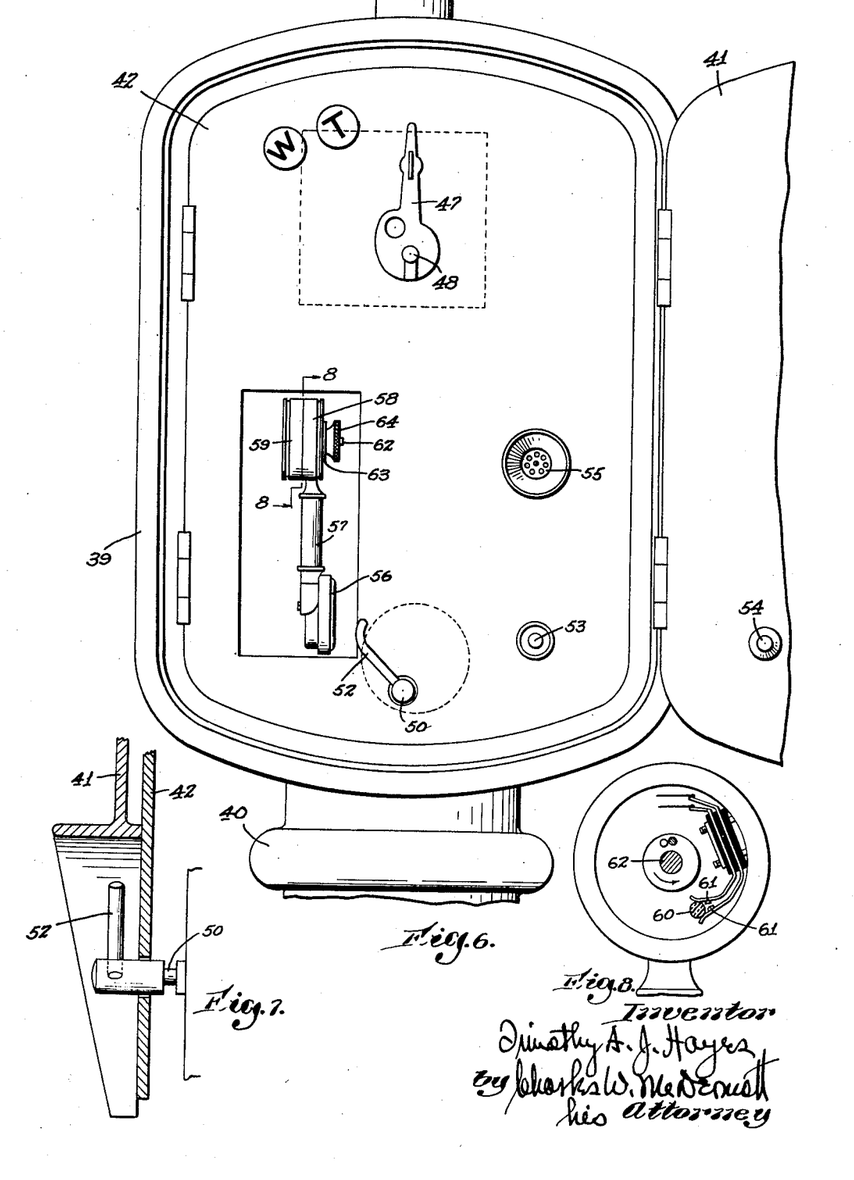
Figure 6 is a detail view in front elevation of the patrol box, the outer door of which is open.
Figure 7 is a detail view in sectional elevation on the line 7—7, Fig. 3.
Figure 8 is a detail view in sectional elevation on the line 8—8, Fig. 6.

When the pointer 47 is moved to the T position the code wheel 49 operates a spring arm 69 (Fig. 5) to make and break the contacts 70. When the pointer 47 is moved to the W position (Fig. 6) the code wheel 49 operates a spring arm 71 to make and break the contacts 72. By means of the contacts 70 or 72 the circuit is made and broken at 73 (Fig. 9) thus sending a series of pulses which correspond to the box number and are registered at the station house. The code calls a wagon to the box pulled or merely indicates the location from which the patrolman is making his routine report, according to whether the pointer 47 is moved to the W or the T position (Fig. 6).

The citizen's alarm circuit is set in motion over the lines 74, 75 and 76 (Figs. 9 and 12), and the signals to flash the lanterns are sent out over the lines 77 and 78. When the citizen pulls down the citizen's alarm arm 52 (Fig. 6) he winds up a spring which in unwinding operates a movement train and rotates the code wheel 51. The train, through the dog 79 (Fig. 5), brings together the contacts 80. The code wheel 51 operates a spring arm 81 to make and break the contacts 82. Movement of the arm 52 from the normal position closes the circuit at the contacts 80 (Figs. 5 and 9) causing a relay to be described, at the station house to be operated over the lines 75 and 76, by a 24-volt battery. This relay in turn operates an automatic line switch which closes a 110-volt circuit and starts a motor-generator set. The code wheel 51 is so timed that when the motor-generator set builds up, the contacts 82 (Figs. 5 and 9) cause another relay to operate over the lines 74, 76. This relay connects the generator-set across the lantern circuit lines 77 and 78 and code is flashed out at all the patrol boxes on the circuit, under control of the code wheel 51 at the box pulled. The register and time stamp are operated, making a record on the tape of the box number pulled and the time thereof at the station house.

Describing the signal system more specifically, when the door 41 to the patrol box is opened the plunger switch 53 closes and connects the 1250-ohm resistance 65 (Fig. 9) and the 70-ohm receiver 56 across the lines 67 and 68. This causes the following circuit to be closed: from the negative side of a 48-volt battery 83 (Fig. 11), through the upper winding of relay 84, the lower winding of the relay 85, over the line 67, through the patrol box circuit (Fig. 9) back over the line 68, the upper winding of relay 85, the lower winding of relay 84 to the positive terminal of the battery 83. The resistance 65 (Fig. 9) placed across the lines 67 and 68 at the patrol box allows sufficient current to flow and operate the relay 85 but the relay 84 does not operate. When the relay 85 operates it closes the following circuits; from the negative line 83 of a 24-volt battery 86 through the left contact 87 of the relay 85, a pilot lamp 36 (Figs. 1 and 11), lower right break contact 88 of the key 33, to the positive terminal of the battery 86, and from the negative line 83 through the right contact 89 of the relay 85, the lower left break contact 90 of the key 33, the buzzer 91, to the positive terminal of the battery 86. The pilot lamp 36 now lights and the buzzer 91 operates, thus notifying the signal desk attendant that the patrol box has been opened.

Figure 11:
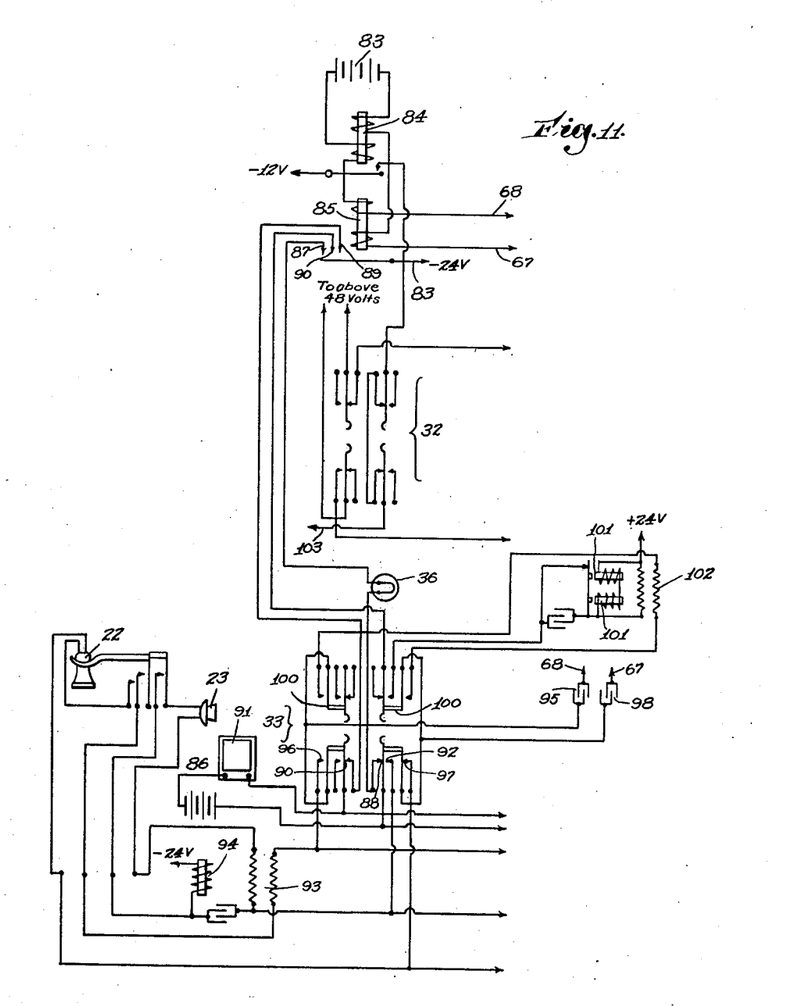
Figure 11 is a diagrammatic view of one of the patrol circuits.

The attendant now throws the key 33 to a talking position which extinguishes the pilot lamp 36, cuts off the buzzer 91 and when the attendant lifts the receiver 22 of his telephone set from the hook, the signal desk set is connected to the telephone set at the patrol box. The calling officer has, by this time, removed his receiver. The circuit will be closed as follows: from the positive terminal of battery 86 through the make contact 92 of the key 33, primary of an induction coil 93, the transmitter 23, the retardation coil 94 to the negative line 83; also from the patrol box over the line 68, through a condenser 95, through the lower left make contacts 96 of the key 33, a secondary of the induction coil 93, the attendant's receiver 22, the lower right make contacts 97 of the key 33, a condenser 98, the line 67 to the patrol box.

When the receivers 22 and 56 are placed on their hooks and the talking key 33 restored to normal, the pilot light 36 relights and the buzzer 91 operates, but are restored to normal when the door 41 of the patrol box is closed. If the signal desk attendant desires to recall the calling patrolman before the door 41 has been closed, he throws the key 33 to the ringing position and closes the following circuit; negative line 83 through the middle made contact 90 of the relay 85, make contacts 100 of the key 33, magnet windings 101 and the primary of the induction coil 102 to the positive terminal of the battery 86. The armature of the magnet 101 vibrates, inducing alternating current in the secondary winding of the induction coil 102. This alternating current is impressed on lines 67 and 68 through the make contacts 100 of the key 33, which is in the ringing position, and the two microfarad condensers 95 and 98. This sets up a tone or "howl" in the receiver 56 at the patrol box, which notifies the patrolman that the signal desk attendant desires to speak to him again.

In addition to talking to division headquarters the patrolman can call a patrol wagon or make his routine report by moving the pointer 47 in the patrol box to the proper position. In either case, movement of the pointer winds the officer's code movement which operates the code wheel 49 and sends code out by repeated short-circuiting of the lines 67 and 68.

When the contacts 72 (Fig. 5) close the following circuit is closed; from the negative terminal of the battery 83 through the upper winding of the relay 84 (Fig. 11), the lower winding of relay 85, over line 67, through the contacts 72 of the code movement, back over the line 68, upper winding of relay 85, lower winding of relay 84 to the positive terminal of the battery 83. The closing of the contacts 72 at the patrol box cuts out the 1250-ohm resistance 65 and the resistance of the 70-ohm receiver 56 causing the current to increase (over the value flowing when the box was opened and the relay 85 operated) and relay 84 operates. This closes a circuit (for each impulse sent out by the code wheel); from minus 12-volts (Figs. 10 and 11) through the make contacts of relay 84, break contacts of key 32 to line 103 (Fig. 10) of the register.

Figure 10:
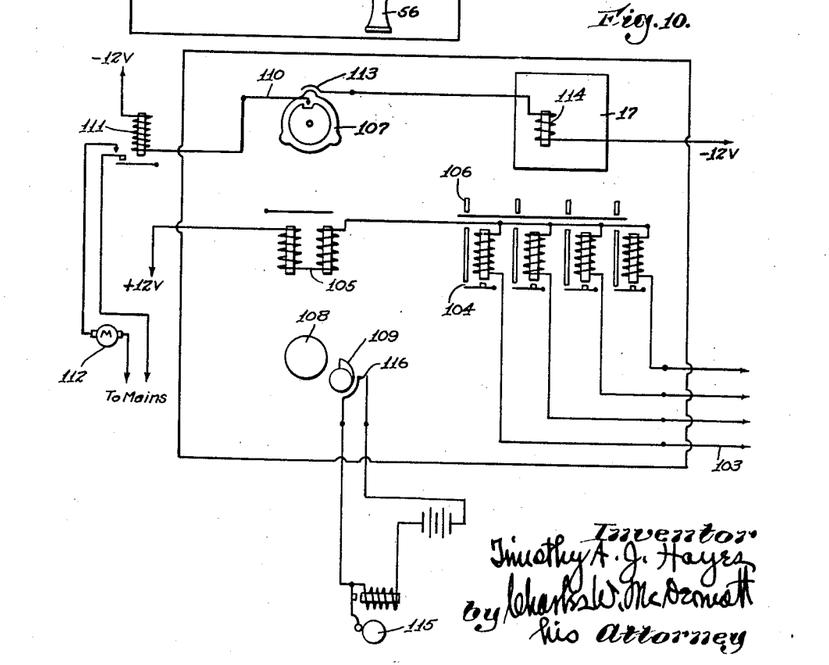
Figure 10 is a diagrammatic view of the register circuit.

As explained above, when the contacts 72 are closed at the officer's code movement, the relay 84 operates and connects minus 12-volts to terminal 103 of the register. This circuit continues through the coil 104 (Fig. 10), the release relay 105 to the frame of the register which is connected to plus 12-volts. The completion of this circuit causes the following to happen simultaneously:

1. The armature of coil 104 pulls up and causes the paper tape to be pushed against the printing wheel 106.

2. The release relay 105 operates and moves an arm which releases the contact wheel 107 and the wheel 108 which are connected to the same shaft and driven by a spring mechanism. Also the creeper wheel 109 is caused to mesh with the wheel 108.

3. The contact wheel 107 is so timed as to make one complete revolution during the period that code is sent out from the patrol box code wheel 49. During this revolution the contact spring 110 is closed and a circuit is established from plus 12-volts (which is already connected to the frame) through the frame, the contact wheel 107, the contact spring 110, the take-up motor relay 111 to minus 12-volts. This relay operates and starts the take-up reel motor 112 which moves the paper tape through the printing mechanism. Also, during one complete revolution of the contact wheel 107, the time stamp 17 is operated three times by means of the following circuit; plus 12-volts, through the frame, the contact wheel 107, the contact spring 113, the time stamp coil 114 to minus 12 volts.

4. For routine reporting only short impulses come in over the lines 67 and 68. However, the "citizen's alarm" and wagon codes are long impulses and operate a gong 115 (Fig. 10) in addition to registering on the paper tape. For long impulses the creeper wheel 109 meshes with the wheel 108 long enough to cause the contact 116 to close and tap the gong 115 once for each long impulse. On the short impulses, the creeper wheel 109 meshes with the wheel 108 but not long enough to close the contact 116.

After one complete revolution of the contact wheel 107 the circuits are broken and the register restored to normal. Wagon calls and citizen alarm codes are repeated three times during one revolution of the contact wheel.

When the "citizen's" alarm arm 52 is pulled at the patrol box, either by the patrolman or by a civilian, the citizen's code wheel 51 is set in motion and the contacts 80 (Fig. 9) close and remain closed thus short-circuiting lines 75 and 76 and closing the following circuit; from minus 24 volts (Fig. 12) over line 76, through the contacts 80 at the patrol box, back over line 75, through the motor-starting relay 118 (Fig. 12) to plus 24 volts. The motor-starting relay 118 closes a circuit to the line starter 119 (Fig. 12) which operates and starts the motor-generator set comprising the motor 120 and the generator 121. The citizen's code alarm wheel 51 is so timed that when the generator has built up to normal voltage contacts 82 (Fig. 9) of the code wheel open and close according to the code of that particular box and complete the following circuit for each impulse: from minus 24 volts (Fig. 12) over line 76 to the patrol box, through contacts 82, back over line 74, through the citizen's flash relay 122 to plus 24 volts. The citizen's flash relay 122 operates (each time the contacts 82 of the code wheel close) and completes the following circuit: from the positive 125-volt terminal 123 of the generator 121 through the feeder fuse 124, over the line 78, through the signal lights 44 on all the patrol boxes in the circuit in operation and back over the line 77, through the contacts 125 of the citizen's flash relay 122, the other feeder fuse 126 to the negative 125-volt terminal 127 of the generator 121. As shown in Fig. 5, the bull's eye 28 is connected across the lines 77 and 78 so that when the circuit over these lines is closed, the bull's eye is lighted.

Figure 12:
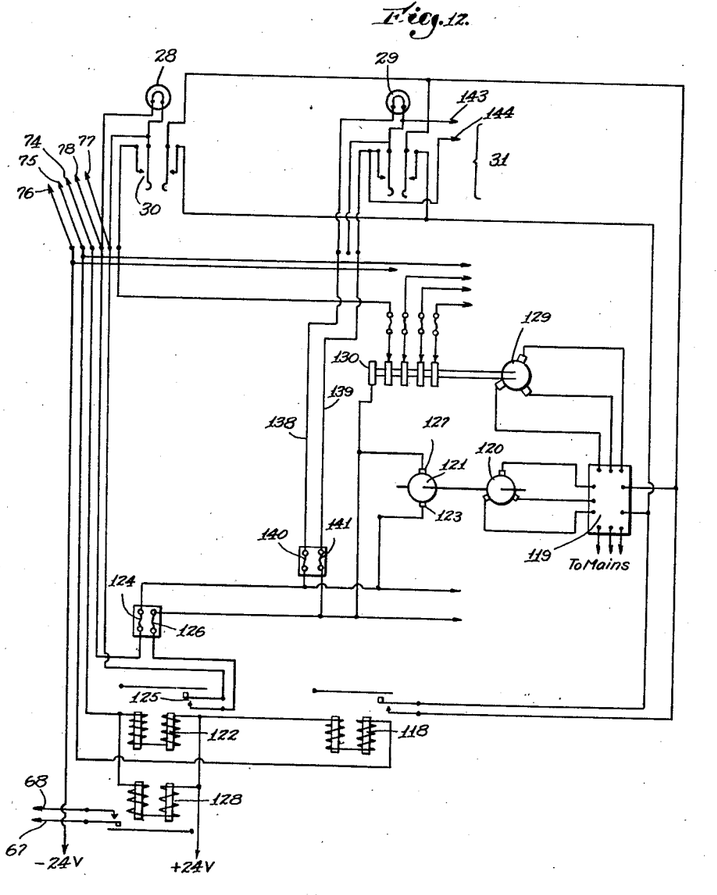
Figure 12 is a diagrammatic view of one of the citizen's alarm and flashing circuits.

The citizen's print relay 128 is in parallel with the citizen's flash relay 122 and operates each time the citizen's flash relay operates. When the citizen's print relay 126 operates, the lines 67 and 68 are short-circuited and the relays 84 and 85 operate. This connects the minus 12 volts to the register circuit which operates as explained in the description of the register circuit.

The movement train which rotates the code wheel 51 runs for thirty-five seconds when the arm 52 is pulled downwardly and then released. As the arm 52 commences to move downwardly an impulse from 24 volts (Fig. 12) operates the relay 118 which in turn operates the line starter 119 thereby starting the motor-generator set. By the time the arm 52 has been moved one-quarter of its distance of travel the generator load is full. By the time the arm 42 reaches its limit of movement downwardly the code wheel 51 operates the contacts 82 which operates the citizen's flash relay 122 to flash the box number pulled to every patrol box on the circuit, to print the box number on the tape in the station house, to stamp the time on the tape, to flash the bull's-eye 28 and to strike the number of the box pulled on the gong 115. The primary purpose of the citizen's alarm is to summon help to a citizen on the street from the station house, or to a patrolman so engaged with an unruly prisoner as to make the opening of the police box difficult or impossible. The second purpose of the citizen's alarm is to signal from the station house the patrolmen on the street, principally those in automobiles and on motorcycles, who go immediately to the box pulled by the citizen. The patrolmen on foot are not required to respond to the box pulled but are obliged to go to the nearest box for orders from the station house. At no time is there more than 24 volts passing through the contacts 80 or 82 at the patrol box. The first patrolman to arrive at the box pulled by the citizen is required to open the box and move the pointer 41 to the T position (Fig. 6), thus recording on the tape in the station house his time of arrival in response to the citizen's signal.

If the station house desires to communicate with a patrolman on the street, the signal desk attendant closes one of the switches 30 (Figs. 1 and 12) which causes the motor-generator set to start up and send a flashing signal to all boxes on a particular circuit. When the signal desk attendant operates the switch 30 the circuit to the line starter 119 (Fig. 12) is closed, the line starter operates, starts the motor-generator set and the driving motor 129 for the rotating drum flasher 130. When the generator 121 has built up to voltage, intermittent flashes will be sent out over the following circuit: from the negative terminal 127 through the flasher 130, the switch 30 over the line 77, through the signal lights 44 at the patrol boxes, back over the line 78 to the positive terminal 123 of the generator 121. All patrolmen, in response to the flashing signal, call division headquarters from the nearest patrol box telephone. As indicated in Fig. 12 the contacts of the flasher 130 are staggered so that only the lanterns 44 in one circuit are lighted at one time. When the signal desk attendant depresses the key 35 (Fig. 1) to the ringing position the following circuit is closed: from plus 12 volts (Fig. 13) through the key 35, the signal bell 131, the signal bell 25 to minus 12 volts. When the garage attendant removes his receiver 132 from the hook, the following circuit is closed; from the negative side of a 48-volt battery 133, through the lower winding of a relay 134, over the line to the garage, through the receiver 132 and the transmitter 135, back over the line to the signal desk and through the upper winding of the relay 134 to plus 48 volts.

The relay 134 operates and closes the following circuits: from minus 12 volts through the left contact 136 of the relay 134, the pilot lamp 37, the break contact 137 of the key 35 to plus 12 volts; also from minus 12 volts through the right contact of relay 134, the break contact of the key 35, the buzzer 91 (Fig. 11) to the positive terminal of the battery 86 (Fig. 11). The pilot lamp 37 lights and the buzzer 91 operates. The attendant now depresses the key 35 to talking position which connects his telephone set with that in the garage.

Figure 1:
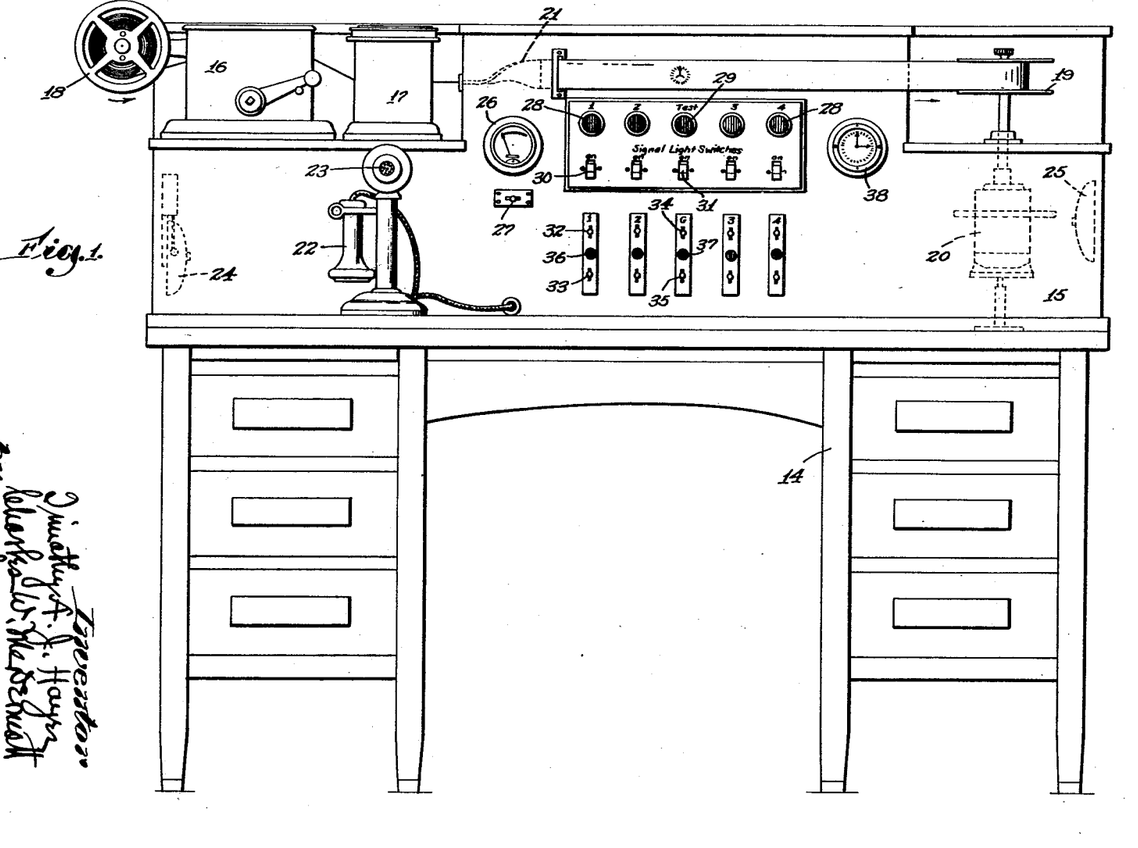
Figure 1 is a view in front elevation of the signal desk at the station house, or division headquarters.
Figure 2:
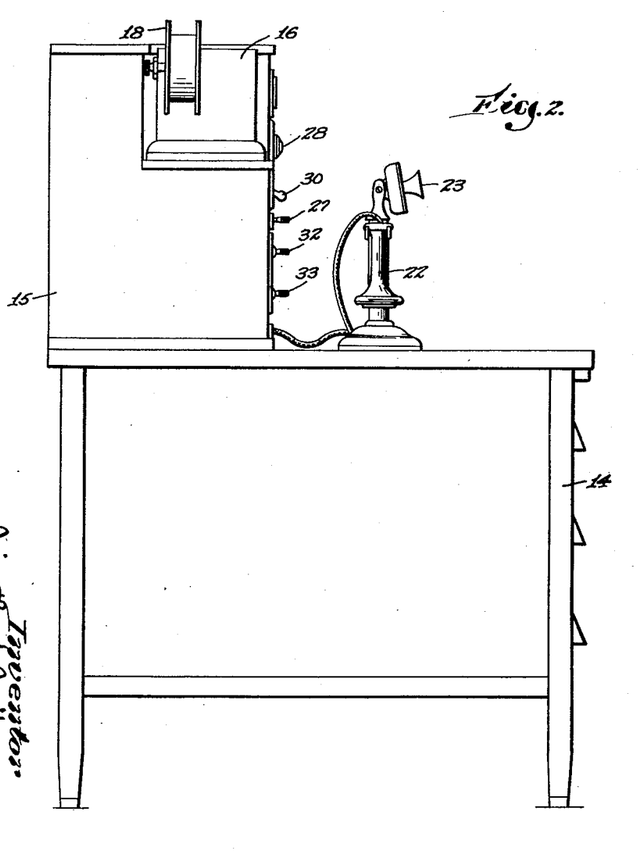
Figure 2 is a view in left side elevation of the signal desk.

To test the generator voltage, the signal desk attendant closes the switch 31 (Figs. 1 and 12)

which starts the motor-generator set through the lines 138 and 139 which connect with the main generator feeders through the fuses 140 and 141. He then moves the test key 27 (Figs. 1 and 13) to the left closing the lower make contacts 142 which completes the following circuit: from the negative terminal of the voltmeter 26 through the lower make contacts 142 of the test key, line 143 (Figs. 12 and 13) to the negative main generator feeder (Fig. 12), from the positive main generator feeder, line 144, make contacts 142 to the positive terminal of the voltmeter 26.

Figure 13:
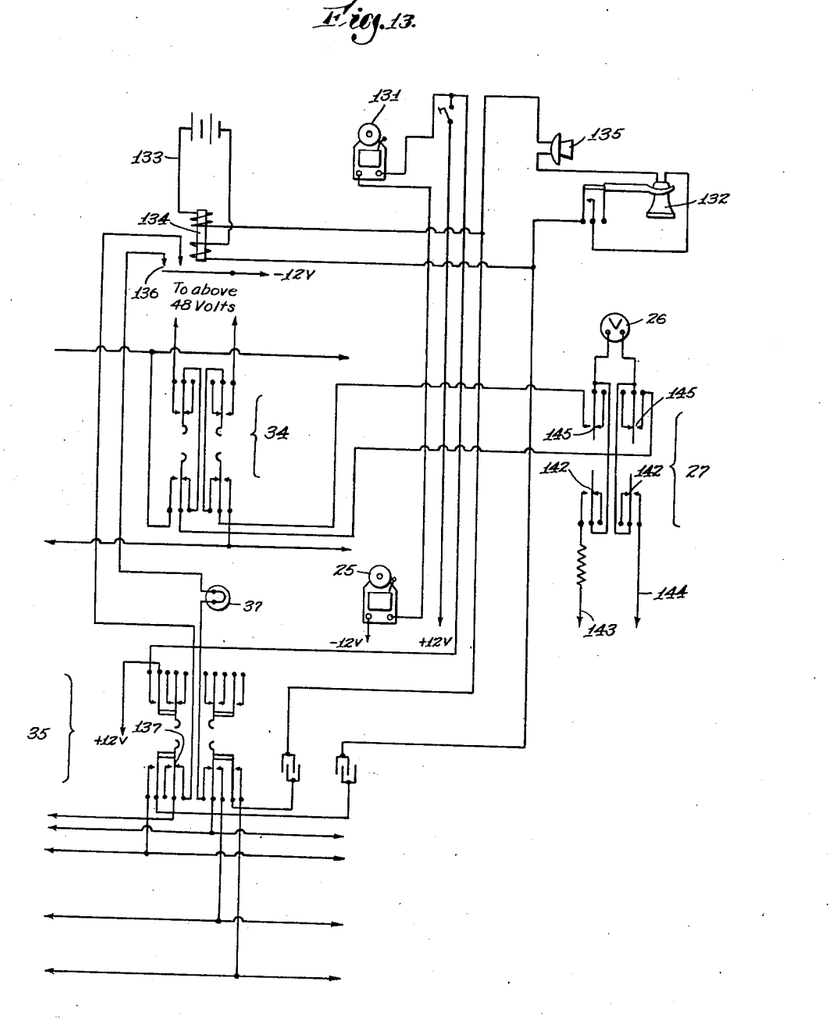
Figure 13 is a diagrammatic view of the test and garage circuits.

To test the 48 volt battery 83 of the patrol circuit, the attendant operates the keys 32 and 34 (Figs. 11 and 13) closing the lower make contacts thereof, and also moves the test key 27 to the right (Fig. 1) closing the upper make contacts 145 (Fig. 13). The following circuit is made: from the positive terminal of the battery 83 (Fig. 11) through the lower left make contact of the key 32 (Fig. 11), the lower right make contact of key 34 (Fig. 13) to the upper left make contacts of the test key 27 to the positive terminal of the voltmeter 26, from the negative terminal of the voltmeter 26, through the upper right make contacts of the test key 27, the lower left make contact of the key 34, the upper left break contact of the key 32 to the negative terminal of the battery 83.

To test the 48 volt garage circuit battery 133 (Fig. 13), the desk attendant operates the keys 32 and 34 closing the upper make contacts thereof. The following circuit is completed: from the negative terminal of the battery 133, through the upper left make contacts of the key 34, the lower left break contacts of the key 32, the upper right make contacts of the test key 27, to the negative terminal of the voltmeter 26, from the positive terminal of the voltmeter 26, through the upper left make contacts of the test key 27 to the lower right break contacts of the key 32, the upper right make contact of the key 34, to the positive terminal of the battery 133.

In the systems heretofore devised for police work it was characteristic to require a patrolman on duty in the streets to send in to the station house from a patrol box a duty call at a predetermined time. This requirement does not tend to promote efficiency. The mere fact that at the predetermined time the duty call came in from the proper patrol box does not prove that it was sent in by the patrolman, for the duty call may have been registered at the predetermined time and from the proper box by some friend or by another patrolman on an adjoining route. Moreover, the fact that the patrolman must be at a certain box at a certain time is known to the criminals as well as to the police, and therefore the said requirement is an advantage to the criminal in that he may wait in hiding until the patrolman has pulled the nearest box and gone on to the next box on his route when the law-breaker may pursue his criminal activity with knowledge of the fact that the patrolman will not return to the box pulled for at least an hour. Furthermore, the said requirement does not afford the patrolman an opportunity to perform intelligent work as a representative of the law in the streets, reducing him, rather to the status of a watchman with no chance to show any initiative or resourcefulness.

By the illustrated embodiment of the present invention predetermined duty calls are abolished. All the patrolman is required to do with respect to his duty calls is to call the station house every forty minutes. This means that the patrolman may report at nine o'clock and again at nine-fifteen if he has any reason to do so. For instance, if the patrolman sees suspicious persons on the street he can devote forty minutes from the nine-fifteen call in watching them and is not compelled to be at any particular patrol box at a predetermined time. If the station house desires to check the activities of the patrolmen on duty in the streets the signal desk attendant may flash the lanterns on the patrol boxes of the patrolman's route and when the patrolman responds to the signal he may be asked to send in a duty call. Then, if the patrolman is at the same box he reported from at nine-fifteen his superior officer may ask him for an explanation. By this system the station house is able to know just where each patrolman on duty in the streets should be. Each patrol division is so arranged that the distances between patrol boxes on the chart in front of the sergeant are such that, allowing the patrolmen time to patrol side streets and, at night, to try shop doors, the sergeant may follow, by means of the signal lights and the patrolmen's responses thereto, the patrolmen around the various routes of the division.

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form, or one electrical form of the invention, it is not limited to these details of construction, nor to the conjoint use of all its features nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new and desired to be secured by Letters Patent of the United States is as follows:

1. In a signal system, the combination with a patrol box adapted to be opened and closed and provided with a telephone set, a station house provided with a telephone set, a normally open circuit connecting the box and the house, and a switch operated by the opening of the box to close the circuit and place the telephone sets therein, of means actuated from the house for inducing alternating current in the circuit to make a howl in the box telephone receiver when the box is open.

2. In a signal system, the combination with a patrol box provided with a visual signal, a station house, and citizen's alarm and box visual signal flashing circuits connecting the box and the house, of means for operating the citizen's alarm and box visual signal flashing circuits from the box.

3. In a signal system, the combination with a patrol box provided with a visual signal, a station house, a normally open circuit connecting the box and the house, a normally open circuit connecting the signal and the house and operating when closed to flash the signal, and a relay in the first circuit for closing the second circuit, of means at the box for closing the first circuit to actuate the relay.

4. In a signal system, the combination with a numbered patrol box adapted to be opened and closed and provided with a visual signal, a station house provided with a source of electrical energy, and a relay for operating the visual signal, of means at the box operable when the box is closed for connecting the source of electrical energy with the signal operating relay to actuate it and for causing the signal to indicate the number of the box.

5. In a signal system, the combination with a plurality of patrol boxes each numbered differently and each provided with a visual signal, a station house provided with a source of electrical energy and with a generator, a normally open circuit connecting the source of electrical energy and the boxes, a normally open circuit connecting the generator and the signals and operating when closed to flash all the signals, and a relay in the first circuit for closing the second circuit, of means at each box for closing the first circuit to actuate the relay in a manner to cause the signals to indicate the number of the box pulled.

6. A signal system having, in combination, a plurality of patrol boxes each provided with a lamp, a station house provided with a generator for lighting the lamps, an electrical circuit between the generator and the lamps, mechanism at each patrol box for closing said circuit to connect the generator with the lamps to actuate them, a signal at the station house, actuated by the establishment from the patrol box of the connection between the generator and the lamps, for indicating the pulling of a box, a register at the station house for registering the number of the box pulled and the time for pulling, and means at the station house, responsive to the establishment from the patrol box of the connection between the generator and the lamps, for actuating the register.

7. A signal system having, in combination, a plurality of patrol boxes each provided with a lamp, a station house provided with a generator for lighting the lamps, an electrical circuit between the generator and the lamps, mechanism at each patrol box for closing said circuit to connect the generator with the lamps to actuate them, a visual signal at the station house, actuated by the establishment from the patrol box of the connection between the generator and the lamps, for indicating the pulling of a box, a register at the station house for registering the number of the box pulled and the time of pulling, means at the station house, responsive to the establishment from the patrol box of the connection between the generator and the lamps, for operating the register, an audible signal at the station house for sounding the number of the box pulled, and means at the station house, responsive to the actuation of the means for operating the register, for operating the audible signal.

8. A signal system having, in combination, a plurality of patrol boxes each numbered differently and each provided with a visual signal for indicating the number of box pulled, a station house provided with a source of electrical energy for operating the visual signals, an electrical circuit between the source of electrical energy and the visual signals, mechanism at each patrol box for closing said circuit to connect all the visual signals with the source of electrical energy, a register at the station house for registering the number of the box pulled, and means at the station house, actuated by the establishment from a patrol box of the connection between the visual signals and the source of electrical energy, for operating the register.

9. A signal system having, in combination, a plurality of patrol boxes each numbered differently and each provided with a visual signal for indicating the number of the box pulled, a station house provided with a source of electrical energy for operating the visual signals, an electrical circuit between the source of electrical energy and the visual signals, mechanism at each patrol box for closing said circuit to connect all the visual signals with the source of electrical energy, a register at the station house for registering the number of the box pulled and the time of pulling, and means at the station house, actuated by the establishment from a patrol box of the connection between the visual signals and the source of electrical energy, for operating the register.

10. In a signal system, the combination with a plurality of patrol boxes each provided with a signal lamp, a station house normally open circuit connecting the house and the boxes, a normally open circuit connecting the house and the signal lamps and operating when closed to flash the lamps, and a relay in the first circuit for closing the second circuit, of means for closing the first circuit from at least one of the boxes to actuate the relay.

11. In a signal system, the combination with a plurality of patrol boxes, each provided with a signal lamp, and a station house provided with a source of electrical energy, of means for connecting from either the house or one of the boxes the source of electrical energy with all the signal lamps to light them.

12. In a signal system, the combination with a plurality of patrol boxes, each numbered differently and each provided with a signal with a source of electrical energy and with a generator, a normally open circuit connecting the source of electrical energy and the boxes, a normally open circuit connecting the generator and the signal lamps, and operating when closed to flash all the lamps, and a relay in the first circuit for closing the second circuit, of means at each box for closing the first circuit to actuate the relay in a manner to cause all the signal lamps to indicate the number of the box pulled.

13. A signal system having, in combination, a plurality of patrol boxes each provided with a visual signal, a station house provided with a source of electrical energy, a generator, and a box call indicating means, a normally open circuit connecting the source of electrical energy and the boxes, a relay in said circuit, means at one of the boxes, operable when the box is open, for closing the circuit to actuate the relay, a normally open circuit, of which the box call indicating means forms a part, closed by the actuation of the relay to actuate the call indicating means, a normally open circuit connecting the generator with the signal lamps, a second normally open circuit connecting the source of electrical energy with the boxes, means at said one of the boxes, operable when the box is closed, for closing the last named circuit, and relays in parallel in said last named circuit, for respectively closing the first named circuit to actuate the relay therein and closing the circuit connecting the generator with the signal lamps to light them.

14. In a signal system, the combination with a plurality of patrol boxes, each provided with a lamp, a station house provided with a source of electrical energy and with a generator, a normally open circuit connecting the source of electrical energy and the boxes, a normally open circuit connecting the generator and the lamps and operating when closed to light the lamps, a signal at the station house actuated by the closing of the second circuit for indicating the operation of the lamps, and a relay in the first circuit for closing the second circuit, of means at each box for closing the first circuit to actuate the relay.

15. In a signal system, the combination with a plurality of patrol boxes, each provided with a lamp, a station house electrically connected to the boxes, and means for lighting all the lamps from at least one of the boxes, of means for lighting all the lamps from the house.

16. In a signal system, the combination with a patrol box provided with a signal, a station house provided with a source of electrical energy, a generator, and a signal, a normally open circuit of which the patrol box and the source of electrical energy form a part, a second normally open circuit of which the signals, the generator, and a circuit closing switch at the station house form a part, said second circuit operating when closed to actuate the signals, and a relay in the first circuit for closing the second circuit independently of the house switch, of means at the box including a coding device for closing the first circuit to actuate the relay.

17. In a signal system, the combination with a patrol box, a station house, means at the box for establishing a connection from the box to the house, a visual signal at the box, means at the house for establishing a connection from the house to the box, of means responsive to the establishment of either of said connections for actuating the visual signal.

18. A signal system having, in combination, a patrol box adapted to be opened and closed, a station house provided with a box call indicating means, a normally open circuit, including a relay, connecting the box and the house, means at the box, operable when the box is open, for closing the first circuit to actuate the relay, a normally open circuit, of which the call indicating means forms a part, closed by the actuation of the relay to actuate the call indication means, a second normally open circuit connecting the box and the house, and means at the box for closing the last named circuit operating upon a closing of said circuit to close the first named circuit.

19. In a signal system, the combination with a patrol box adapted to be opened and closed and provided with a telephone set, a station house provided with a telephone set, a normally open circuit connecting the box and the house, and a switch operated by the opening of the box to close the circuit and place the telephone sets therein, of a circuit for producing a sound in the box telephone receiver when it is on its hook and the door is open, said circuit including a key at the house, a source of electrical energy, an induction coil having its secondary winding connected to the first named circuit, and means controlled by the key and connected to the primary winding of the induction coil for inducing alternating current in said secondary winding.

20. A signal system having, in combination, a plurality of patrol boxes each numbered differently and each provided with a visual signal for indicating the number of the box pulled, a station house provided with a source of electrical energy, a relay for operating all the visual signals, mechanism at each patrol box for connecting the source of electrical energy with the signal operating relay to actuate it, means at the station house for registering the number of the box pulled, and a print relay in parallel with the signal operating relay and responsive to the actuation thereof for causing the registering means to operate.

21. A signal system having, in combination, a plurality of patrol boxes each provided with a lamp, a station house provided with a source of electrical energy and with a generator, a relay for flashing the lamps at the patrol boxes, mechanism at each patrol box for connecting the source of electrical energy and the generator with the flashing relay to actuate it, a signal at the station house, responsive to the actuation of the flashing relay, for indicating the pulling of a box, a print relay at the station house in parallel with the flashing relay and responsive to the actuation thereof, a register at the station house for registering the number of the box pulled and the time of pulling, and a relay responsive to the actuation of the print relay for operating the register.

22. A signal system having, in combination, a plurality of patrol boxes each provided with a lamp, a station house provided with a source of electrical energy and with a generator, a relay for flashing the lamps at the patrol boxes, mechanism at each patrol box for connecting the source of electrical energy and the generator with the flashing relay to actuate it, a visual signal at the station house, responsive to the actuation of the flashing relay, for indicating the pulling of a box, a print relay at the station house in parallel with the flashing relay and responsive to the actuation thereof, a register at the station house for registering the number of the box pulled and the time of pulling, a relay responsive to the actuation of the print relay for operating the register, an audible signal at the station house for sounding the number of the box pulled, and a release relay responsive to the actuation of the last named relay for sounding the audible signal.

JOSEPHINE HAYES GREENE,
*Administratrix of the Estate of Timothy A. J. Hayes, Deceased.*